J. W. PAGE.
WIRE CRIB FOR FORMING POSTS OF STONE.
APPLICATION FILED JAN. 17, 1910.

1,135,134.

Patented Apr. 13, 1915.
2 SHEETS—SHEET 1.

J. W. PAGE.
WIRE CRIB FOR FORMING POSTS OF STONE.
APPLICATION FILED JAN. 17, 1910.
1,135,134.
Patented Apr. 13, 1915.
2 SHEETS—SHEET 2.
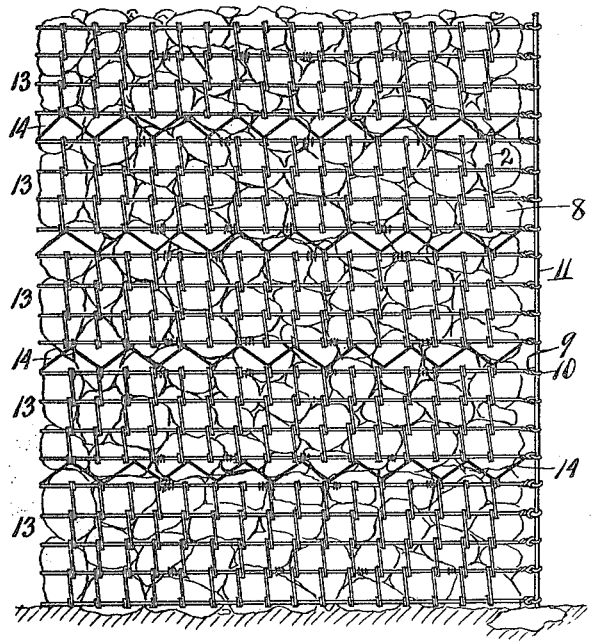
Fig. 3.
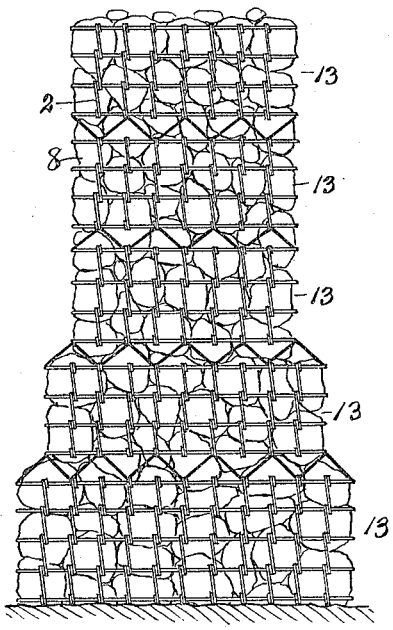
Fig. 4.
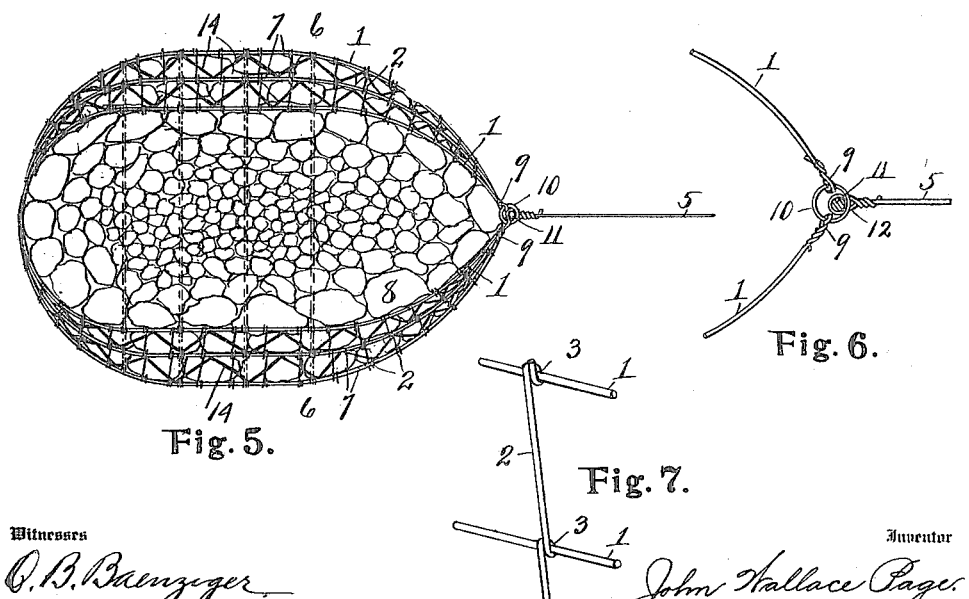
Fig. 5.
Fig. 6.
Fig. 7.
Witnesses
O. B. Baenziger
J. G. Howlett
Inventor
John Wallace Page.
By T. A. Wheeler.
Attorney.

UNITED STATES PATENT OFFICE.

JOHN WALLACE PAGE, OF ADRIAN, MICHIGAN.

WIRE CRIB FOR FORMING POSTS OF STONE.

1,135,134.   Specification of Letters Patent.   Patented Apr. 13, 1915.

Application filed January 17, 1910. Serial No. 538,362.

*To all whom it may concern:*

Be it known that I, JOHN WALLACE PAGE, a citizen of the United States, residing at Adrian, in the county of Lenawee, State of Michigan, have invented certain new and useful Improvements in Wire Cribs for Forming Posts of Stone; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to the construction of fence posts of stones or analogous materials, and consists in the association and arrangement of parts hereinafter more fully set forth and claimed.

The object of the invention is to provide means for holding in the form of a vertical column loose stones in a manner to enable them to serve as a fence post, provision being made for confining said stones within a crib formed of fence wire, which allows the bottom stones to rest upon the ground and retains the superimposed stones in place so as to cause the mass to assume such shape as to give the desired formation to the post. By this arrangement provision is made for utilizing the stones when gathered from the surface of the fields under cultivation, said stones being deposited in the retaining crib of wire, wherein they are not only confined but are caused to form themselves into a vertical column or post, which although erected upon the surface, is exceedingly staunch because of its immense weight, and from which the line wires of a wire fence may be strung, or upon which a gate may be hung.

The above object is attained by the structure illustrated in the accompanying drawings, in which:—

Figure 1:
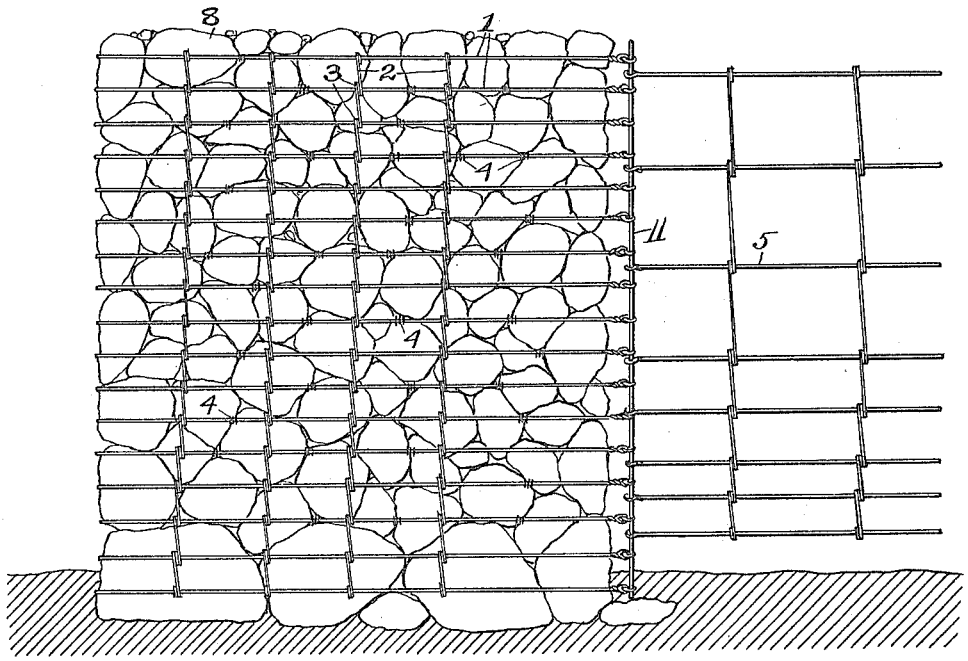
Figure 2:
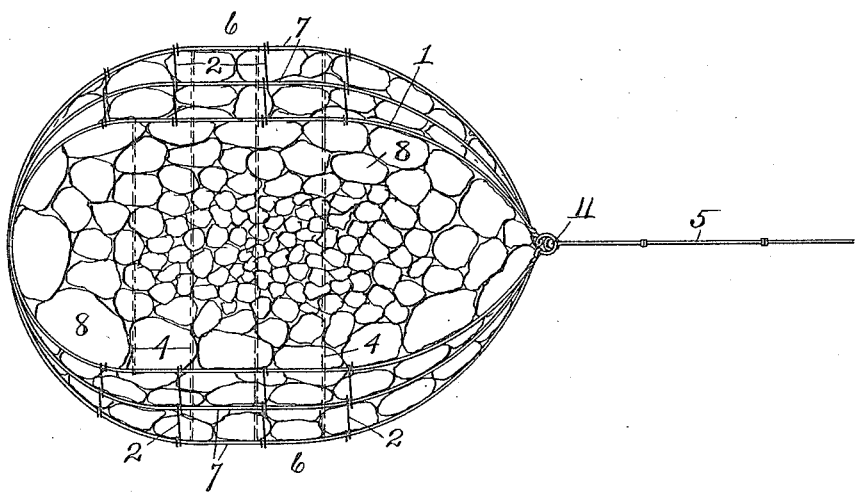

Figure 1 is a side elevation of a stone fence post involving my invention, showing a portion of a wire fence attached thereto. Fig. 2 is a plan view of Fig. 1. Fig. 3 is a side elevation of a fence post embodying my invention, of slightly modified form. Fig. 4 is an end elevation of Fig. 3. Fig. 5 is a plan view of Figs. 3 and 4. Fig. 6 is a fragmentary view in detail, showing one manner of attaching the ends of the embracing loops which encircle the body of the post to the line wires of a fence. Fig. 7 is a fragmentary view in perspective, showing one manner of tying the body loops together by means of the vertical or stay wires which form a part of the wire crib structure.

In carrying out my invention a wire crib is formed comprising a plurality of oblong loops 1, which are spaced a suitable distance apart and which are tied together by the vertical or stay wires 2 wrapped successively around said loops, as shown at 3, or tied thereto in any other suitable manner. The opposite sides of the loops 1 are tied together by the lateral cross wires 4 which hold said loops to their form so as to give to the stone post erected within and confined by said loops, the desired shape in cross section. The major axis of the post is placed parallel with the line of fencing so as to afford the greatest resistance in the direction of the line of strain exerted by the fence attached thereto which is illustrated at 5 in Figs. 1 and 2. To brace the post laterally, the base thereof on the sides is caused to extend or swell outwardly, as shown at 6, the lower or bottom loops 7 of the crib being of greater diameter than the superimposed loops 1 which constitute the main portion of the crib. After the crib has been formed, it is placed on the spot where it is desired to erect the post and is filled with stones 8, care being taken to select large and heavy stones for the base and to dispose the larger stones around the wall of the wire crib, after which the central portion of the post may be filled in with smaller stones, as shown, to complete the structure.

If desired, the crib may be erected upon the spot where the post is to stand and may be filled with the stones gathered from the surface of the fields as rapidly as the crib is erected. No excavating is necessary to prepare a foundation for the post, as it may be erected upon the surface of the ground, and owing to its great weight, it will find its own foundation. Should the post settle or the stones settle through the wire cribbing, more stones may be added to the top of the post to compensate therefor.

To provide for attaching the line wires of a wire fence to the post, the meeting ends of the loops 1 may be provided with suitable eyes 9 through which may be passed a bobbin or ring 10, as shown in Fig. 6. These rings are caused to register vertically so as to enable a bar 11 to be passed downwardly therethrough, as clearly shown in Figs. 1 and 3; at which time said bar 11 is also passed through the eyes 12 at the ends of the line wires of the fence to attach the fence to the post. The arrangement just described is employed where the post is made to serve as a terminal post. Where the post is employed as an intermediate post, the same provision will be made for attaching the line of fencing thereto to extend in the opposite direction. In cases where the post is to serve as a gate post, the bar 11 will be larger and of such a character as to enable a gate to be attached thereto.
In some instances it may be desirable to construct the crib 13 in sections of woven wire fabric, as illustrated in Figs. 3 to 5 inclusive. These sections comprise superimposed divisions of the crib which are successively placed in position as the post is erected, said sections being tied together by a wire lacing 14, or in any other suitable manner. By making the cribbing in sections, it is more easily filled for the reason that when the lower sections are being filled, the stones need not be lifted so high. A further advantage in making the cribbing in sections resides in the fact that the stones may be more readily disposed therein without the necessity of placing a workman within the crib.

By this arrangement stones collected from cultivated fields are made to serve as a durable and stable fence post without the expense and labor incident to building the post with mortar or cement, and without necessitating the use of any materials excepting those which the farmer has readily at hand. The embracing wire crib is sufficiently flexible to allow the stones with which it is filled to settle into place, yet is of such strength as to securely confine the stones therein and compel them to assume and maintain an erect column as the crib is filled therewith.

Having thus fully set forth my invention, what I claim as new and desire to secure by Letters Patent, is:—

1. A stone fence post comprising a crib of wire fabric formed of independent horizontally disposed sections joined together vertically, a filling of loose stones within the crib forming a column, an exterior vertical bar, means connecting said bar to the wire fabric of the crib, said vertical bar providing means for connection of the longitudinal fence wires to the post.

2. A fence post of masonry comprising a crib of flexible wire fabric consisting of embracing horizontal wires connected by vertical stays and transverse tie wires crossing between and connected to the sides of the embracing wires as to give an oval shape to the post in cross section, and a filling of loose stones within the crib confined in place thereby to assume an erect column.

In testimony whereof, I sign this specification in the presence of two witnesses.

JOHN WALLACE PAGE.

Witnesses:
EDNA CULVER,
F. E. OSGOOD.